(12) United States Patent
Jarrossay et al.

(10) Patent No.: US 11,746,668 B2
(45) Date of Patent: Sep. 5, 2023

(54) ASSEMBLY OF A TURBOMACHINE TURBINE RING AND STATOR

(71) Applicant: Safran Aircraft Engines, Paris (FR)

(72) Inventors: Clément Jarrossay, Moissy-Cramayel (FR); Clément Emile André Cazin, Moissy-Cramayel (FR); Sébastien Serge Francis Congratel, Moissy-Cramayel (FR); Antoine Claude Michel Etienne Danis, Moissy-Cramayel (FR); Aurélien Gaillard, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 17/913,917

(22) PCT Filed: Mar. 22, 2021

(86) PCT No.: PCT/FR2021/050465
§ 371 (c)(1),
(2) Date: Sep. 23, 2022

(87) PCT Pub. No.: WO2021/191534
PCT Pub. Date: Sep. 30, 2021

(65) Prior Publication Data
US 2023/0118738 A1 Apr. 20, 2023

(30) Foreign Application Priority Data

Mar. 24, 2020 (FR) .................................... 2002855

(51) Int. Cl.
*F01D 11/08* (2006.01)
*F01D 11/00* (2006.01)
*F01D 25/24* (2006.01)

(52) U.S. Cl.
CPC .......... *F01D 11/005* (2013.01); *F01D 25/246* (2013.01); *F05D 2260/201* (2013.01)

(58) Field of Classification Search
CPC ........ F01D 11/08; F01D 11/005; F01D 25/24; F01D 25/246; F01D 9/04; F05D 2240/11; F05D 2240/55; F05D 2260/201
See application file for complete search history.

(56) References Cited

U.S. PATENT DOCUMENTS

| 2011/0179798 | A1 | 7/2011 | Pieussergues et al. | |
| 2013/0323033 | A1* | 12/2013 | Lutjen | F01D 1/02 415/173.1 |

(Continued)

FOREIGN PATENT DOCUMENTS

| EP | 2 642 078 A2 | 9/2013 |
| EP | 2 642 078 A3 | 12/2013 |

(Continued)

OTHER PUBLICATIONS

International Search Report for PCT/FR2021/050465 dated Jul. 2, 2021.

(Continued)

*Primary Examiner* — David E Sosnowski
*Assistant Examiner* — Maxime M Adjagbe
(74) *Attorney, Agent, or Firm* — Birch, Stewart, Kolasch & Birch, LLP

(57) ABSTRACT

The invention relates to a turbine assembly comprising: a plurality of ring sectors forming a ring; a support structure comprising a shroud from which there project radial flanges which serve to hold latching tabs of each ring sector; a stator positioned downstream of said ring and comprising a blade provided with a radially outer platform and extending axially opposite said ring; an annular space being defined between the ring, the support structure and the platform, this (Continued)

annular space having passing through it a leakage air current, the assembly comprising a hollow ring which occupies said annular space and which is shaped so as to collect, channel and expel said leakage air current, more specifically to channel and expel it into the radially inner region of said annular space.

10 Claims, 7 Drawing Sheets

(56) References Cited

U.S. PATENT DOCUMENTS

| | | | |
|---|---|---|---|
| 2016/0003078 A1* | 1/2016 | Stevens | F01D 11/005 277/650 |
| 2016/0186596 A1 | 6/2016 | Tatman et al. | |
| 2016/0186611 A1* | 6/2016 | Vetters | F01D 25/246 415/173.2 |
| 2017/0044920 A1* | 2/2017 | Vetters | F01D 11/12 |
| 2017/0101882 A1* | 4/2017 | Sippel | F01D 11/005 |

FOREIGN PATENT DOCUMENTS

| | | |
|---|---|---|
| FR | 2 937 098 A1 | 4/2010 |
| FR | 3 004 518 A1 | 10/2014 |

OTHER PUBLICATIONS

Written Opinion of the International Searching Authority for PCT/FR2021/050465 dated Jul. 2, 2021.

* cited by examiner

ASSEMBLY OF A TURBOMACHINE TURBINE RING AND STATOR

FIELD OF THE INVENTION

The present invention relates to a ring and stator assembly of a turbomachine turbine.

PRIOR ART

The field of application of the invention is in particular that of aeronautical gas turbine engines. The invention is, however, applicable to other turbomachines, for example industrial turbines.

Shown in the appended FIG. 1 is an aircraft propulsion assembly 1 which comprises a turbomachine 2 shrouded by a nacelle 3. In the example shown, the turbomachine 2 is a double flow turbofan engine.

This figure includes a reference frame $D_A$, $D_R$ and $D_C$ which defines, respectively the longitudinal (axial) radial and circumferential directions, which are orthogonal with one another.

Hereafter in the present description the terms "upstream" and "downstream" are defined with respect to a main flow direction of a gas flow through the propulsion assembly 1 when it is propelled, i.e. from left to right in the appended figures. The direction F is parallel to the longitudinal direction of the assembly.

The turbofan 2 has a longitudinal central axis A around which extend its different components, namely from upstream to downstream a fan 40, a low-pressure compressor 41, a high-pressure compressor 42, a combustion chamber 43, a high-pressure turbine 44 and a low-pressure turbine 45.

The compressors 41 and 42, the combustion chamber 43 and the turbines 44 and 45 form a gas generator together.

During the operation of the turbofan 2, an air flow 10 penetrates into the propulsion assembly 1 through an air inlet upstream of the nacelle 3, then passes through the fan 40 and is then divided into a central primary flow 10A and a secondary flow 10B. The primary flow 10A flows in a main gas circulation stream 11A passing through the compressors 41 and 42, the combustion chamber 43 and the turbines 44 and 45. The secondary flow 10B, for its part, flows in a secondary stream 11B surrounding the gas generator and radially delimited toward the outside by the nacelle 3.

The object of the invention is included in particular within the scope of the integration of an external high-pressure turbine stator comprising a ring, for example of ceramic matrix composite (CMC). The integration of this CMC ring, which withstands a high temperature, allows reducing the flow rate of air extracted at the bottom of the chamber, necessary for the pressurization of cavities outside the stream, and therefore achieving an improvement in the specific fuel consumption of the engine.

This ring thus being less cooled, it is also a smaller flow rate of cool air that will run along the upstream side of the platform of the low-pressure stator which is located downstream of the previously mentioned ring. The result is a risk of degradation of this zone.

The appended FIGS. 2 to 4 allow a better understanding of the "architecture" of this zone and the phenomena implemented.

Thus, very particularly, a turbine ring 5 of ceramic matrix composite material (CMC) and a metallic support structure (6) of this ring are partially visible in FIGS. 2 and 3.

This ring 5 surrounds a set of rotating blades (which are not shown here) and is formed from a plurality of ring sectors 50 (of which only one is visible in the figures). The arrows $D_A$ and $D_R$ indicate respectively the axial and radial direction of the turbine ring 5.

As illustrated in the figures, each ring sector 50 has, along a plane defined by the axial $D_A$ and radial $D_R$ directions, a cross section substantially in the shape of the inverted Greek letter n (pi). This cross section comprises an annular base 51 and upstream and downstream radial latching tabs, respectively 52 and 53.

In embodiments not illustrated here, the cross section of the ring could have a different shape, for example similar to the letter "K."

The ring 5 support structure 6, which is integral with a turbine casing, comprises a central shroud 60, which extends overall in the axial direction $D_A$. Its axis of revolution is congruent with the axis of revolution of the turbine ring 5 when they are attached together. The structure also comprises a first and a second annular radial flange 61, respectively 62. The first flange 61 is positioned upstream of the second flange 62.

Other means, such as annular flanges, pins and screw/nut assemblies, allow immobilizing the ring sectors 50 both in the axial as in the radial direction.

Downstream of the central shroud 60, and more precisely downstream of the flange 62, the structure 6 continues generally axially by a set of partitions of which certain, 63 and 64 serve in particular for retaining the radially outer platform 70 of a stator 7, equipped with a vane 72) of the previously mentioned low-pressure turbine 45. In the figures, the stator is shown only partially because what interests us here is essentially its "outer" portion, i.e. that which is located in the continuity, in the downstream sense, of the ring 5.

The stator 7 is mounted, via a hook 71 at a mounting zone in a recess of the structure 6.

This particular formation of the central shroud 60 of the structure 6 and of the platform 70 of the stator 7 causes an annular space E, which opens radially inward in the region E1 to join the primary flow mentioned in the introduction, to subsist between them.

Shown in FIG. 2, in the form of an arrow GC, is the hot gas flow which circulates in the previously mentioned main stream 11A and "licks" the ring 5, as well as the platform 70 of the stator 7.

However, a flow rate of cool air originating in an extraction within the high-pressure compressor 42 circulates in the direction of the stator 7. More precisely, the air transits by a main path to cool the stator while passing through a jacket (not visible in the drawings).

Nevertheless, air leaks along a secondary path which deviates from the main path, particularly through unsealed interstices located where the structure 6 connects to the platform 70.

Moreover, the cooling air of the ring 6 escapes through it to generate together the leakage "air currents" denoted by the reference AFR in FIG. 2. Unfortunately, the air flow rate thus generated, relatively dispersed, which tends to escape through the space E1, is not sufficient for cooling the upstream portion of the platform 70 of the stator 7.

When the ring 5 is made of metal and despite a high flow rate of cool air in this zone, there exists a risk of degradation of this upstream portion. And when the ring is of ceramic matrix composite (CMC), due to the flow rate of air dedicated to its significantly diminished cooling, this risk is still accentuated. The concerned region is that situated at the end of the arrow g of FIG. 2.

The present invention specifically has as its object to offer a solution to this problem.

Expressed differently, the present invention has as its object to supply means which allow limiting, even preventing the risk of degradation formulated above, without modifying the architecture of the parts present.

PRESENTATION OF THE INVENTION

To this end, the invention relates to a turbomachine turbine assembly extending around an axis and comprising:
 a plurality of ring sectors forming a turbine ring
 a turbine ring support structure, each ring sector having, in a section plane defined by an axial direction and a radial direction of the turbine ring, said axial direction corresponding to the flow direction of a gas flow in said turbine, a portion forming a base with, in the radial direction of the turbine ring, a radially inner face defining the inner face of the turbine ring and a radially outer face from which latching tabs project, said ring support structure including a shroud from which radial flanges project, by which said latching tabs of each ring sector are retained;
 a stator located, relative to said flow direction of a gas flow in said turbine, downstream of said turbine ring and mounted via a hook at a mounting zone in a recess of the ring support structure, the stator including a vane provided with a radially outer platform, the platform extending axially facing said turbine ring;
 an annular space being defined between the ring, the support structure and the platform, this annular space being traversed, during the operation of said turbine, by a leakage air current originating in a space located radially outside the stator and which leaks while passing through the mounting zone,
 characterized by the fact that it includes a hollow ring which occupies said annular space and which is formed to collect said leakage air current, to channel it and to expel it in the radially inner region of said annular space, between said turbine ring and the platform.

Due to these features, the cooling air is "collected" by the hollow ring and re-injected into the primary stream. By proceeding in this manner, the flow of air is accelerated, which allows maximizing the heat exchange coefficients with the upstream zone of the platform of the low-pressure stator, and consequently to reduce its temperature so as to guarantee better durability of the part.

According to other non-limiting and advantageous features of the invention, taken individually or in any combination of at least two of them:
 said hollow ring includes an air inlet in the form of an annular slit for collecting the leakage air current;
 the hollow ring includes an air outlet comprising a set of air ejection orifices formed in the wall of the ring;
 the orifices are distributed circumferentially around the hollow ring;
 the orifices are positioned so as to be oriented toward an upstream zone of the platform;
 the inlet and the outlet are axially offset with respect to one another, the inlet being located downstream relative to the outlet;
 the hollow ring has a curved wall, formed to be attached to the platform, and which delimits an edge of said inlet;
 the orifices are arranged at the bottom of a recess of the hollow ring;
 the hollow ring is metallic.

Finally, the present invention also relates to a turbomachine comprising a turbine ring assembly conforming to any one of the features detailed above.

DESCRIPTION OF THE FIGURES

Other features and advantage of the invention will appear from the description that will now be given, with reference to the appended drawings which show, by way of indication and without limitation, possible embodiments of it.

In these drawings.

DETAILED DESCRIPTION OF THE INVENTION

Henceforth FIG. 5 and later figures will be referred to more particularly to describe the hollow ring 8 which forms part of the assembly according to the present invention.

Figure 6:
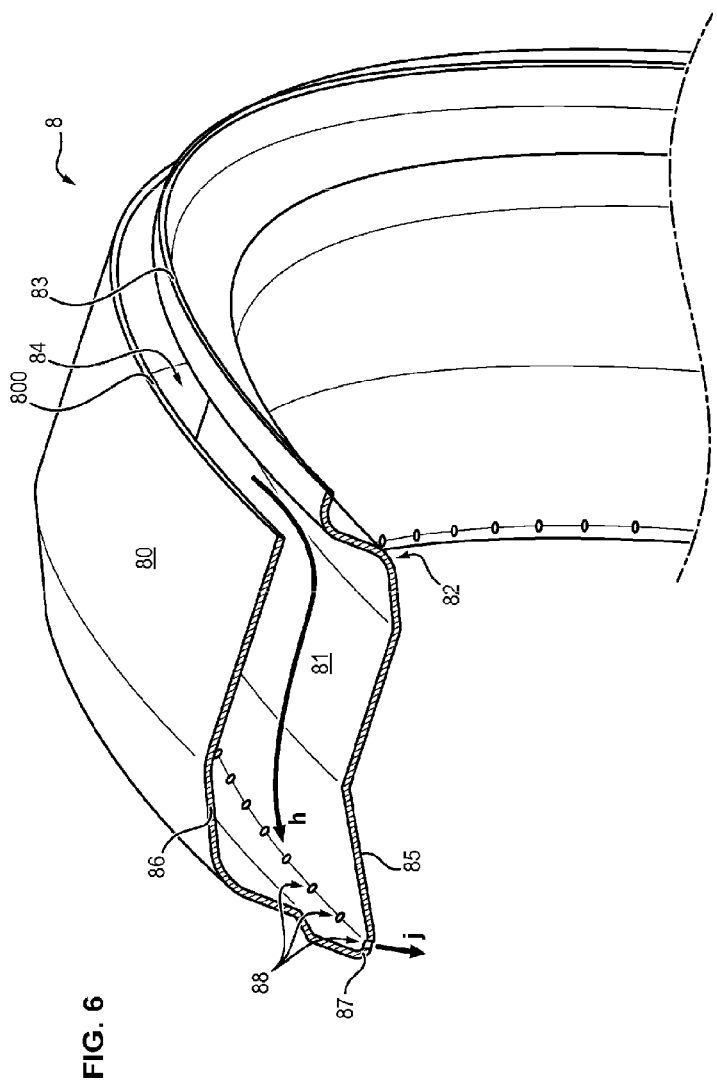
FIG. 6 is a partial section view of the ring that is visible in FIG. 5.
Figure 7:
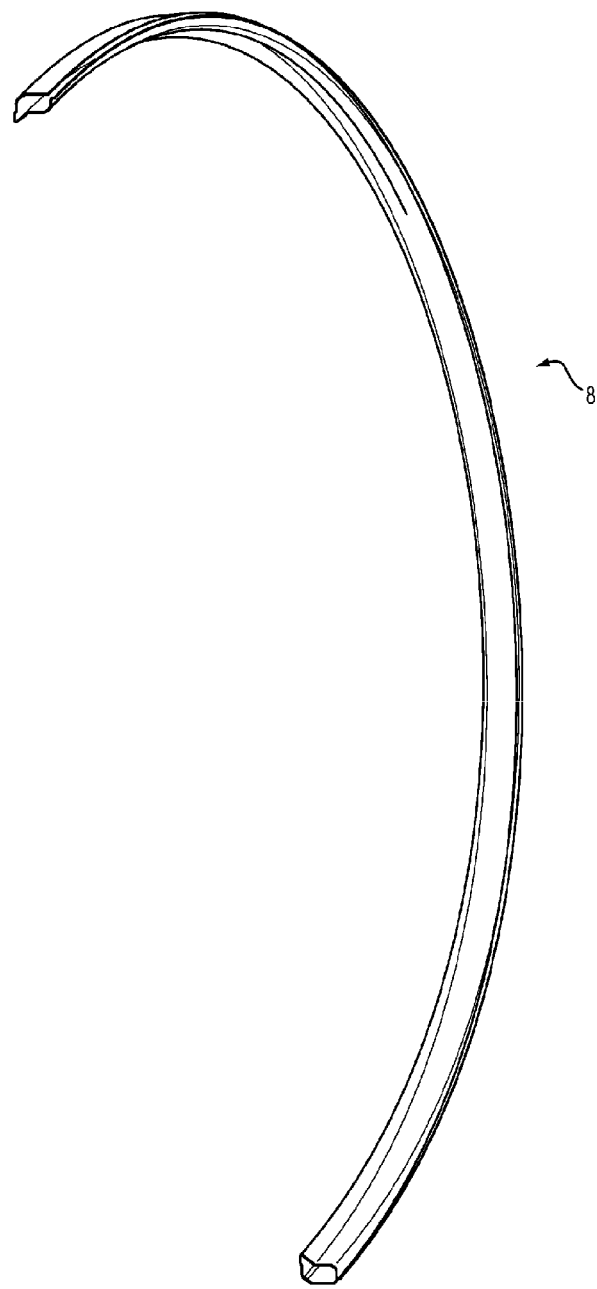
FIG. 7 is a view similar to the preceding figure, which shows a substantial part of the ring.
Figure 8:
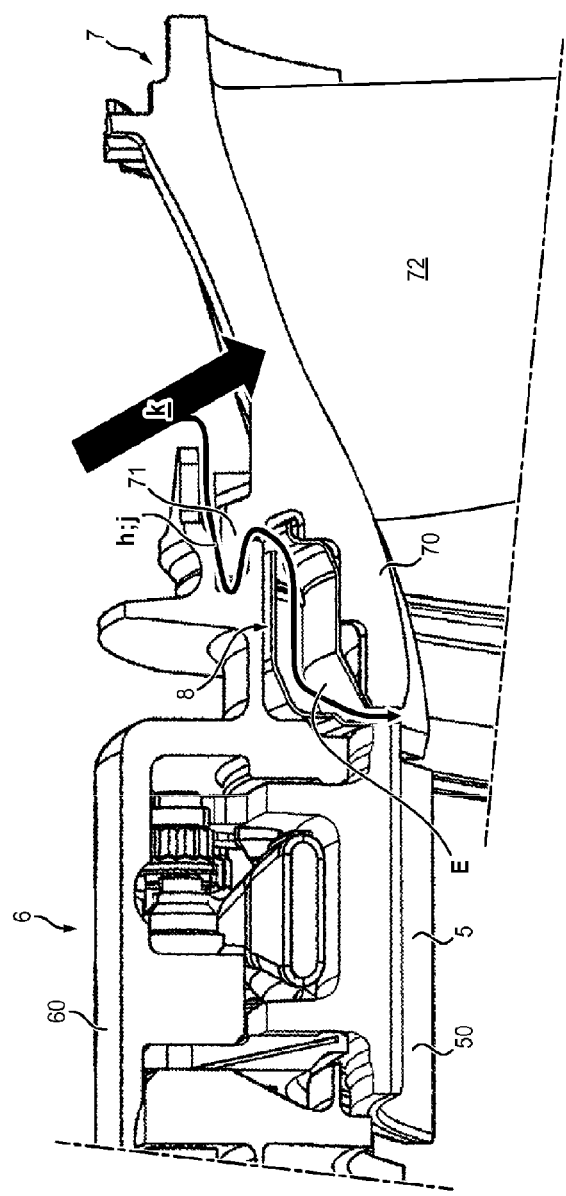
FIG. 8 is a view analogous to FIG. 3, which shows the positioning of the previously mentioned ring and the progress of the air through it.

This hollow ring 8 is preferably metallic. As is particularly visible in FIG. 6, the ring 8 includes two parallel annular walls 80 and 81. When the ring 8 is in place in the assembly according to the present invention and as shown in FIG. 8, these two walls 80 and 81 have generators which extend parallel to the axial direction of the turbine.

The wall 80, which can be qualified as an outer wall, is interrupted in the downstream direction at a free edge 800 constituting one of the limits of an annular inlet 84 which will be discussed again later in this description.

The wall 81, which can be qualified as an inner wall, continues for its part in the downstream direction, with an extension 82 with a sinuous profile, in the general shape of an "S."

The downstream end of the "S," with reference 83, constitutes a curved wall which is formed to be attached to the platform 70, as will be seen below. Moreover, this end constitutes the second limit of the annular inlet 84.

Said downstream end 83 is axially offset from the edge 800 of the wall 80, so that the space located between them is materialized by an annular slit 84 which form an inlet for the cooling air to be channeled.

In the upstream direction, the walls 80 and 81, mentioned previously, continue substantially parallel to one another in a radially inner direction with two sidewalls 86 and 85 which join to constitute together an annular recess 87 directed radially.

An annular air outlet, which here has the form of a set of through orifices 88, is arranged at the bottom of the recess 87. Advantageously, these orifices are distributed circumferentially around the hollow ring. The distribution of these orifices 88 at the bottom of the recess can be regular, or selected depending on the desired flow rate of air in certain zones of the recess.

They have as their object to accelerate the flow rate of air which passes through the ring 8. Purely by way of indication, their diameter can be comprised between 0.2 and 2 mm.

Figure 1:
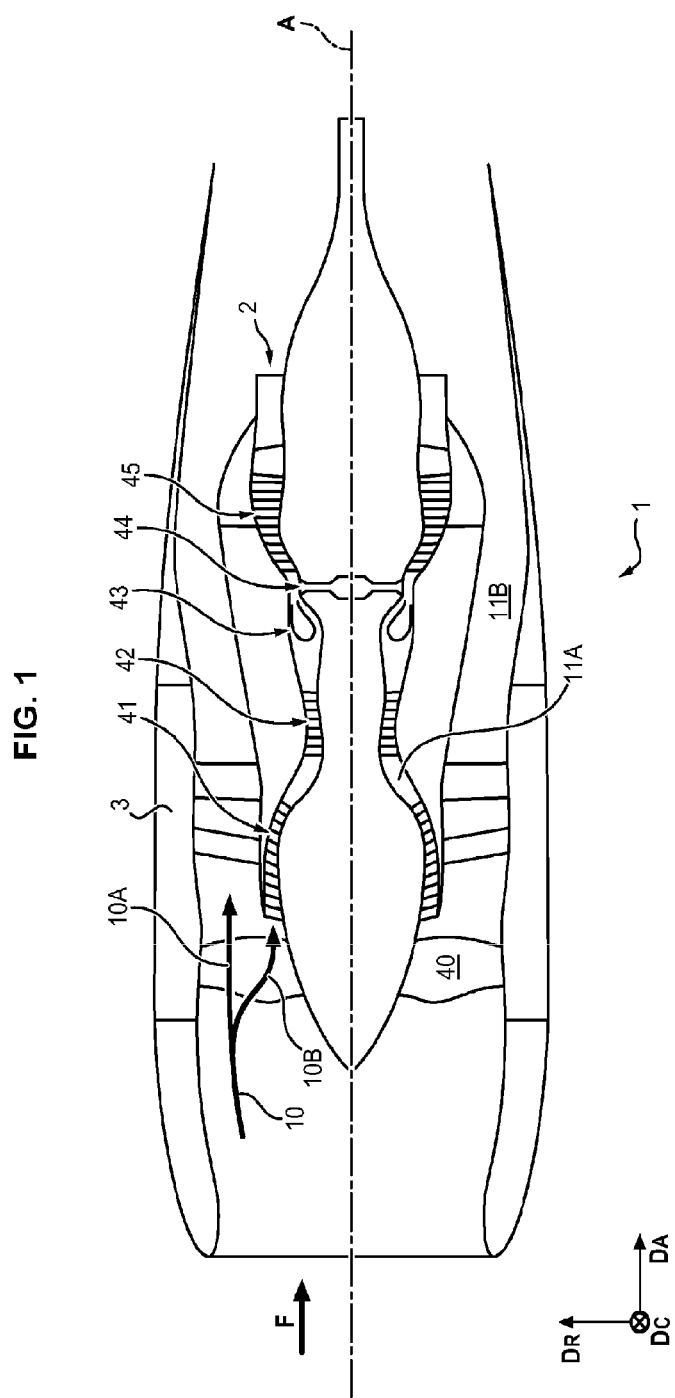
FIG. 1 is a partial schematic view of an aircraft propulsion assembly conforming to the present invention.
Figure 2:
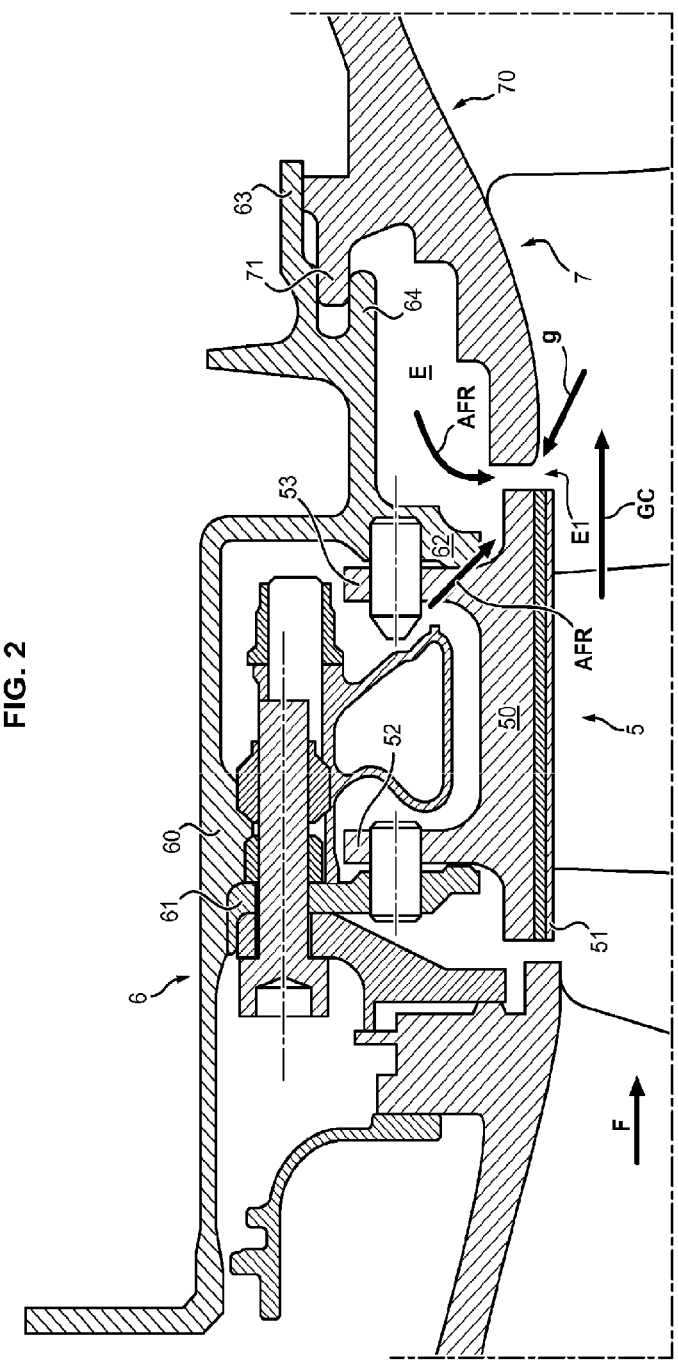
FIG. 2 is a partial section view of an assembly comprising a [turbine] ring and stator.
Figure 3:
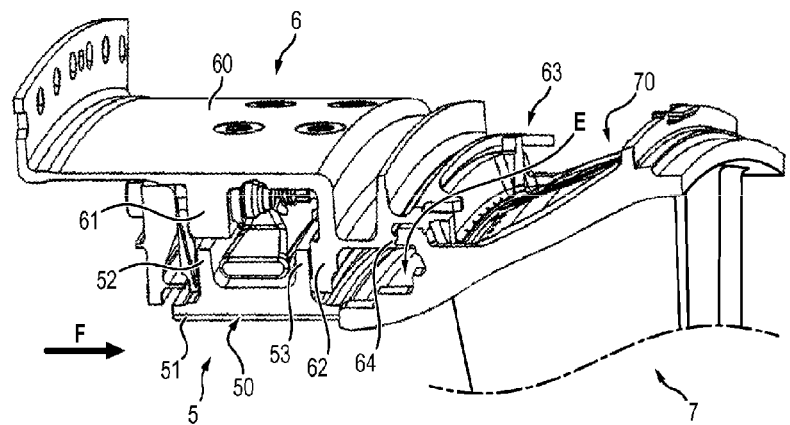
FIG. 3 is a three-dimensional section view of the assembly of FIG. 2.
Figure 4:
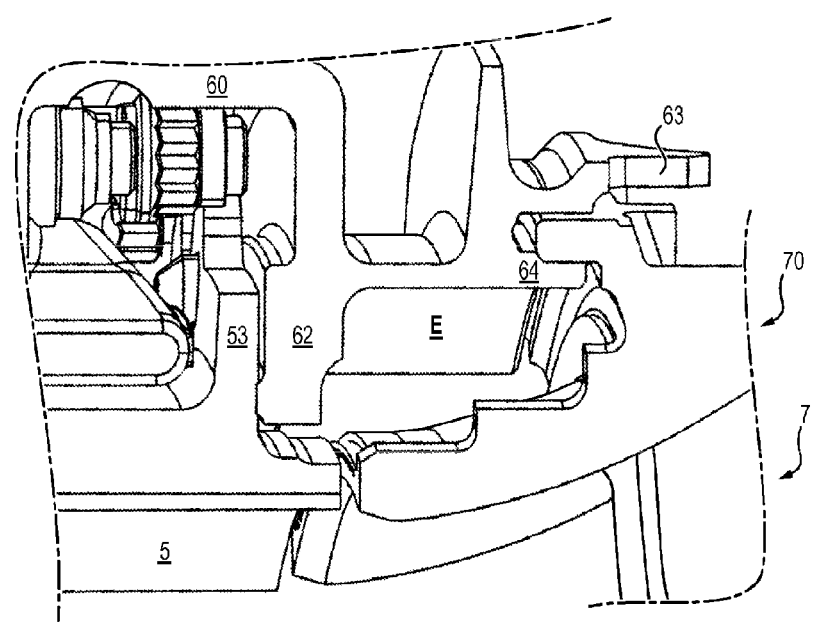
FIG. 4 is an enlarged view of a portion of FIG. 3.
Figure 5:
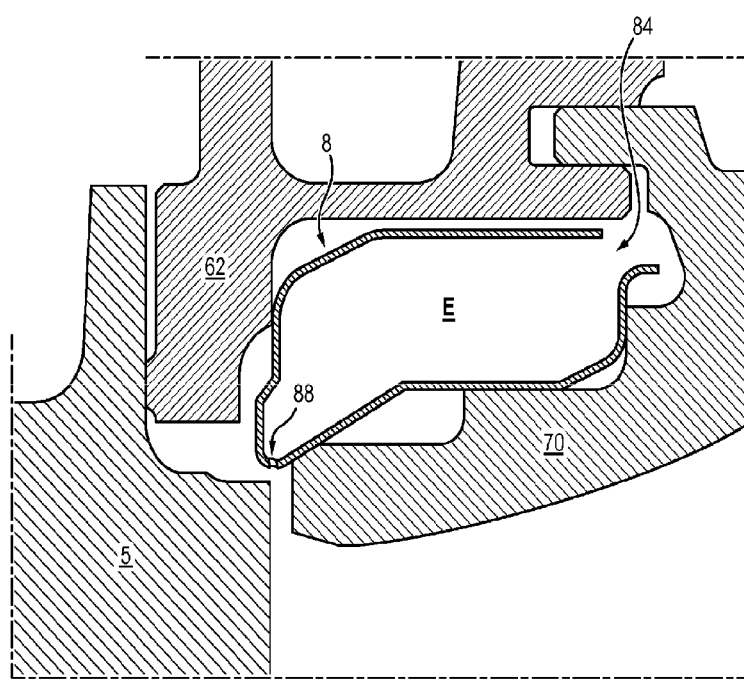
FIG. 5 is a detail view of the space between the ring and the stator which receives, shown in section, a hollow ring for channeling and expelling air.

As is more particularly visible in FIGS. 5 and 8, the hollow ring 8 is positioned within the previously mentioned assembly in the space E where leakage air currents circulate. The general shape of the ring 8 is particularly suited to the shape of this space.

The ring 8 is held in place by compression between the stator 7 and the downstream tab 62 of the structure 6 of the high-pressure turbine.

Shown in FIG. 8, by the arrow k is the main cooling air current of the stator 7, and by the arrows h and j (also visible in FIG. 6), the leakage air current.

Unlike the situation of the prior art in which this air, which is dispersed, partially reaches and does not sufficiently cool the target zone, due to the hollow ring 8 described above, the major portion of this air is collected by the inlet in the form of an annular slit 84.

Within the ring, the walls 80 and 81 act as deflectors which channel, i.e. orient the air toward the recess 87, from which it escapes through the orifices 88 in an equal number of air jets, the speed of which is accelerated when passing through them.

If necessary, the orifices 88 are positioned so as to be oriented toward different "hot zones" of the platform 70 of the stator 7.

Due to the presence of this hollow ring 8, a particularly notable reduction in the "hot zones" of the platform of the stator is able to be obtained.

The invention claimed is:

1. A turbomachine turbine assembly extending around an axis and comprising
   a plurality of ring sectors forming a turbine ring;
   a turbine ring support structure, each of said plurality of ring sectors having, in a section plane defined by an axial direction and a radial direction of said turbine ring, said axial direction corresponding to a flow direction of a gas flow in said turbomachine turbine assembly, a portion forming a base with, in the radial direction of said turbine ring, a radially inner face defining the inner face of said turbine ring and a radially outer face from which latching tabs project, said turbine ring support structure including a shroud from which radial flanges project, by which said latching tabs of each ring sector are retained;
   a stator located, relative to said flow direction of the gas flow in said turbomachine turbine assembly, downstream of said turbine ring and mounted via a hook at a mounting zone in a recess of said turbine ring support structure, said stator including a vane provided with a radially outer platform, said outer platform extending axially facing said turbine ring;
   an annular space being defined between said turbine ring, said turbine ring support structure and said outer platform, the annular space being traversed, during operation of said turbomachine turbine assembly, by a leakage air current originating in a space located radially outside said stator and which leaks while passing through said mounting zone,
   wherein said turbomachine turbine assembly includes a hollow ring which occupies said annular space and which is formed to collect said leakage air current, to channel it and to expel it in a radially inner region of said annular space, between said turbine ring and the said outer platform.

2. The assembly according to claim 1, wherein said hollow ring includes an air inlet in the form of an annular slit for collecting the leakage air current.

3. The assembly according to claim 1, wherein said hollow ring includes an air outlet comprising a set of air ejection orifices formed in a wall of said hollow ring.

4. The assembly according to claim 3, wherein said air ejection orifices are distributed circumferentially around said hollow ring.

5. The assembly according to claim 3, wherein said air ejection orifices are positioned so as to be oriented toward an upstream zone of said outer platform.

6. The assembly according to claim 2, wherein said hollow ring includes an air outlet comprising a set of air ejection orifices formed in the wall of said hollow ring and wherein said inlet and outlet are axially offset with respect to one another, said inlet being located downstream relative to said outlet.

7. The assembly according to claim 6, wherein said hollow ring has a curved wall, formed to be attached to the outer platform, and which delimits an edge of said inlet.

8. The assembly according to claim 3, wherein said air ejection orifices are arranged at the bottom of a recess of said hollow ring.

9. The assembly according to claim 1, wherein said hollow ring is metallic.

10. A turbomachine comprising the turbomachine turbine assembly according to claim 1.

* * * * *